US007039132B1

United States Patent
Chen et al.

(10) Patent No.: US 7,039,132 B1
(45) Date of Patent: May 2, 2006

(54) DIFFERENTIAL DETECTION OF GFSK SIGNAL USING DECISION FEEDBACK AND PREAMBLE FOR CARRIER, CLOCK AND FRAME SYNCHRONIZATION

(75) Inventors: Hung-Kun Chen, Hsinchu (TW); Kwang-Cheng Chen, Palo Alto, CA (US); Jui-Hsi Cheng, Hsinchu (TW); Chung-Yen Huang, Hsinchu (TW)

(73) Assignee: Integrated Programmable Communications, Inc., Palo Alto, CA (US)

( * ) Notice: Subject to any disclaimer, the term of this patent is extended or adjusted under 35 U.S.C. 154(b) by 1104 days.

(21) Appl. No.: 09/799,802

(22) Filed: Mar. 7, 2001

(51) Int. Cl.
 *H04L 27/14* (2006.01)
 *H04L 27/16* (2006.01)
 *H04L 27/22* (2006.01)

(52) U.S. Cl. .................... 375/334; 375/324; 375/340

(58) Field of Classification Search ................ 375/316, 375/324, 334, 340, 342, 344, 354, 377, 269, 375/272
See application file for complete search history.

(56) References Cited

U.S. PATENT DOCUMENTS

| 4,829,542 A | 5/1989 | Shibano |
| 5,208,836 A | 5/1993 | Edbauer |
| 5,448,594 A | 9/1995 | Huang et al. |
| 5,805,642 A | 9/1998 | Wei et al. |
| 5,946,359 A * | 8/1999 | Tajiri et al. .................. 375/331 |
| 6,181,755 B1 * | 1/2001 | Junell .......................... 375/362 |
| 6,763,074 B1 * | 7/2004 | Yang .......................... 375/328 |

OTHER PUBLICATIONS

Abbas Yongacoglu et al.; *Differential Detection of GMSK Using Decision Feedback*; IEEE Transactions on Communications, vol. 36, No. 6, Jun. 1988, pp. 641-649.
Ralf Mehlan et al.; *A Fully Digital Feedforward MSK Demodulator with Joint Frequency Offset and Symbol Timing Estimation for Burst Mode Mobile Radio*; IEEE Transactions on Vehicular Technology, vol. 42, No. 4, Nov. 1993; pp. 434-443.

* cited by examiner

*Primary Examiner*—Jean B. Corrielus
(74) *Attorney, Agent, or Firm*—J.C. Patents

(57) ABSTRACT

This invention provides a method for bit detection of the GFSK signals at the receiver end. The bit detection is done digitally after the carrier is removed. It employs differential detection incorporated with decision feedback, which uses previous one (so-called on-bit differential detection), or two (so-called two-bit differential detection) bits as correcting information. In addition, synchronization for bit timing and frequency offset resulted from clocks between the transmitter and receiver are also performed with or without preamble as prior information. If preamble is available, the bit timing and frequency-offset bias are estimated from the preamble, which is the case of this present invention. If preamble is not available, this information is estimated directly from the unknown received signals. Once the information about the bit timing and frequency offset is obtained, it is used for the following bit detection.

26 Claims, 7 Drawing Sheets

DIFFERENTIAL DETECTION OF GFSK SIGNAL USING DECISION FEEDBACK AND PREAMBLE FOR CARRIER, CLOCK AND FRAME SYNCHRONIZATION

FIELD OF INVENTION

The present invention is related to communication systems, and more particularly, to the digital modem system using GFSK transmission scheme.

BACKGROUND OF INVENTION

Please refer to FIG. 1, which shows a typical GFSK receiver structure. The antenna 100 receives a GFSK signal 110 propagating through channel, then the RF circuit 120 removes the carrier from the received GFSK signal 110 and obtains a baseband analog complex signal z(t) 130. The purpose of ADC (analog-to-digital converter) 140 is to sample the analog baseband complex signal 130 to a digital baseband complex signal $z_{k,j}$ 150, and the baseband circuit 160 demodulates and processes the digital baseband complex signal 150 and obtains the original binary sequence b(k) 170.

The invention is related to the digital modem system using GFSK scheme to transmit the signal in the baseband. The digital baseband complex signals are demodulated using differential detection. In other word, the decision of a bit is based on the phase difference between the current and its previous received signals. In addition, to demodulate a signal correctly also requires certain mechanism for synchronization. The synchronization tasks include carrier frequency, phase and symbol timing. Generally, a communication system will provide extra information (so-called preamble or training sequence) to aid the receiver to accomplish these tasks. This present invention develops algorithms to perform differential detection of GFSK signal using decision feedback and preamble (training sequence) for frequency, clock and frame synchronization.

GFSK, which employs Gaussian filter for pulse shaping, is an attractive modulation scheme due to its compact spectrum. However, the Inter-Symbol-Interference (ISI) introduced by the Gaussian filter also degrades the bit error rate (BER) performance. Various receiver structures were proposed to improve the BER performance of GFSK owing to the ISI resulted from Gaussian filter. ABBAS et al (reference b.1) proposed a method using differential detection with decision feedback to overcome the ISI issue. In their original paper, they only dealt with GMSK modulation and assumed that clock and frequency have been synchronized perfectly.

As to the synchronization issue, Mehian et al (reference b.2) proposed a method to estimate the symbol timing and frequency offset without training sequence. In their original paper, they only dealt with GMSK modulation and used conventional differential detection.

This present invention modifies, combines, and extends their works from GMSK to GFSK. For a given pre-known preamble, this invention estimates the frequency offset using the preamble as prior information and estimate the symbol timing using the estimated frequency offset. Once the estimated frequency offset and symbol timing are obtained, this information is used to do differential detection incorporating with decision feedback.

SUMMARY OF INVENTION

A method and a circuit of estimating a binary sequence in a GFSK communication system are disclosed in the present invention. First in response to a complex baseband signal and a preamble data t(k), obtain a frequency offset estimation. Then obtain a complex digital decimated signal by estimating a sampling point. Based on the complex digital decimated signal, the frequency offset estimation, using one-bit and two-bit differential detection technique to demodulate the complex digital decimated signal to generate the binary sequence. Finally, in responsive to the binary sequence and the preamble data t(k), obtain a starting bit of the binary sequence.

BRIEF DESCRIPTION OF DRAWINGS

The present invention will become fully understood from the detailed description given herein below with the accompanying drawings, given by way of illustration only and thus not intend to limit the present invention.

DETAILED DESCRIPTION OF PRESENT INVENTION

To describe the invention clearly, a number of definition of terms used herein are given as follows:

The term "symbol" refers to data represented by more than one bit.

The term "preamble" used herein refers to a data string both sender and receiver agree to use as an information header embedded in the transmission signal.

Figure 1:
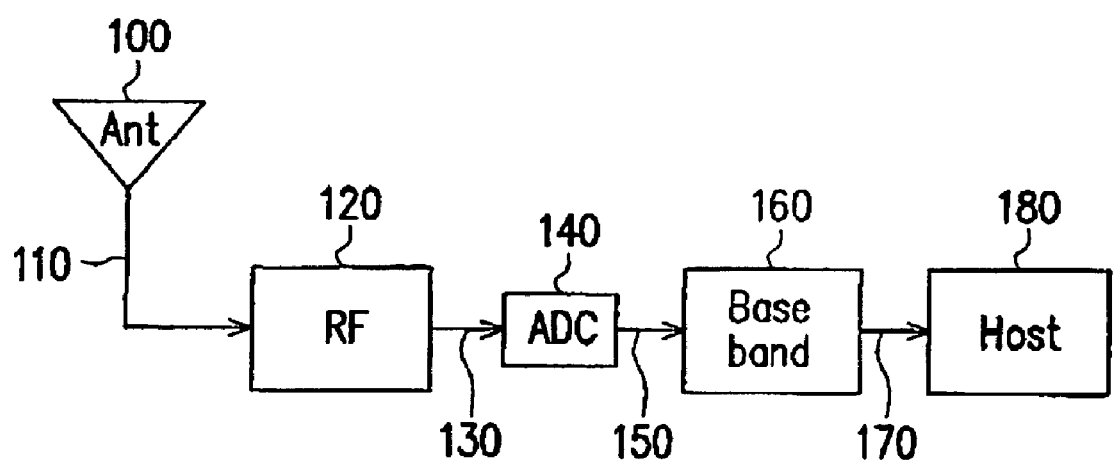
FIG. 1 illustrates a typical GFSK receiver structure.
Figure 2:
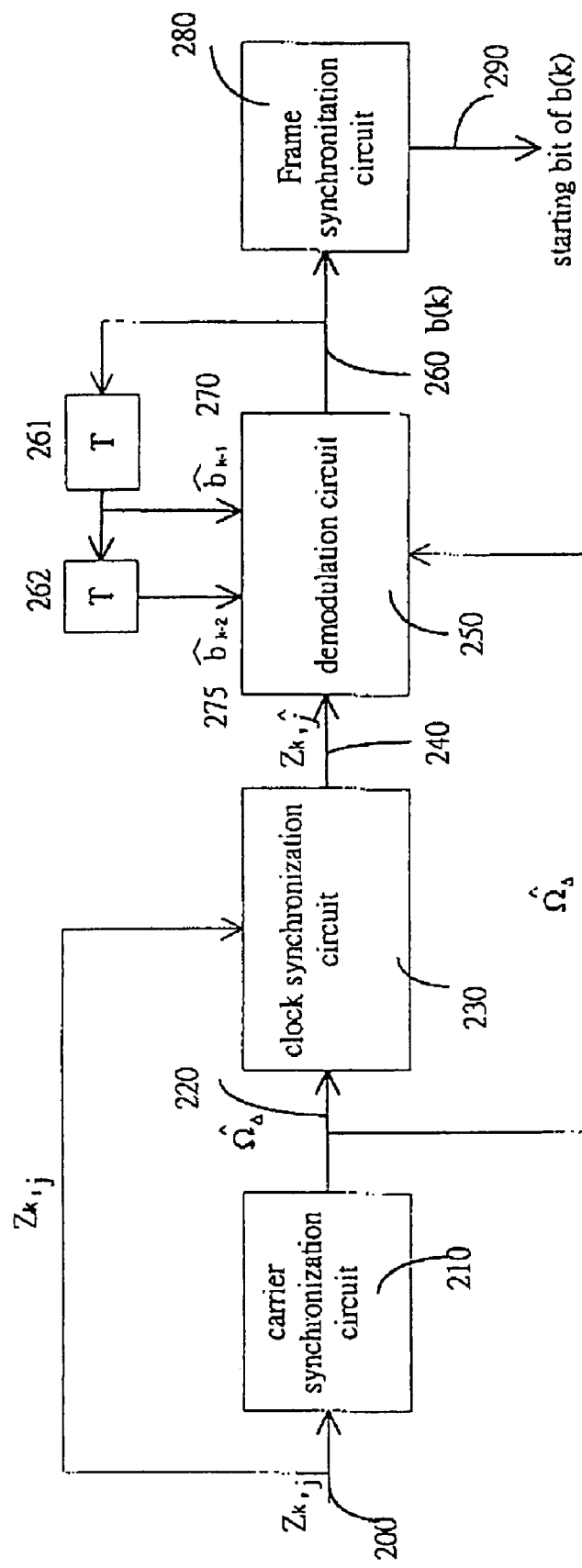
FIG. 2 illustrates the block diagram of present invention.

FIG. 2 illustrates the block diagram of the present invention. One aspect of the present invention is to use the baseband circuit for estimating a binary sequence b(k)={$b_0$, $b_1$, $b_2$, ..., $b_{k-2}$, $b_{b-1}$, $bb_k$, $b_{k+1}$, ... } in GFSK communication system. In response to a complex baseband signal $z_{k,j}$ 200 and a preamble data t(k) defined in the GFSK communication system, a carrier synchronization circuit 210 generates a frequency offset estimation $\hat{\Omega}_\Delta$ 220, wherein $z_{k,j}$ 200 represents a j-th sample of a k-th symbol of a received data, $0 \leq j \leq N-1$, N represents samples per symbol. A clock synchronization circuit 230 receives the complex digital signal $z_{k,j}$ 200 and the frequency offset estimation $\hat{\Omega}_\Delta$ 220, estimates a sampling point ĵ and generates a complex digital decimated signal $z_{k,\hat{j}}$ 240 by using the sampling point ĵ. A demodulation circuit 250 demodulates the complex digital decimated signal $z_{k,\hat{j}}$ 240 to generate the binary sequence b(k)={$b_0$, $b_1$, $b_2$, ..., $b_{k-b}$, $b_{k-1}$, $b_k$, $b_{k+1}$, ... } 260 in response to the complex digital decimated signal $z_{k,\hat{j}}$ 240 by using the frequency offset estimation $\hat{\Omega}_\Delta$ 220, a first bit $b_{k-1}$ 270 and a second bit $b_{k-2}$ 275, wherein the first bit $b_{k-1}$ 270 and the second bit $\hat{b}_{k-2}$ 275 are generated by passing the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ through a T delay circuit 261 and two T delay circuit (261+262) respectively.

Finally, in FIG. 2, a frame synchronization circuit 280 receives the binary sequence 260 $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ and uses the preamble data t(k) defined in the GFSK system, to obtain the starting bit 290 of the binary sequence 260 $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$.

Figure 3:
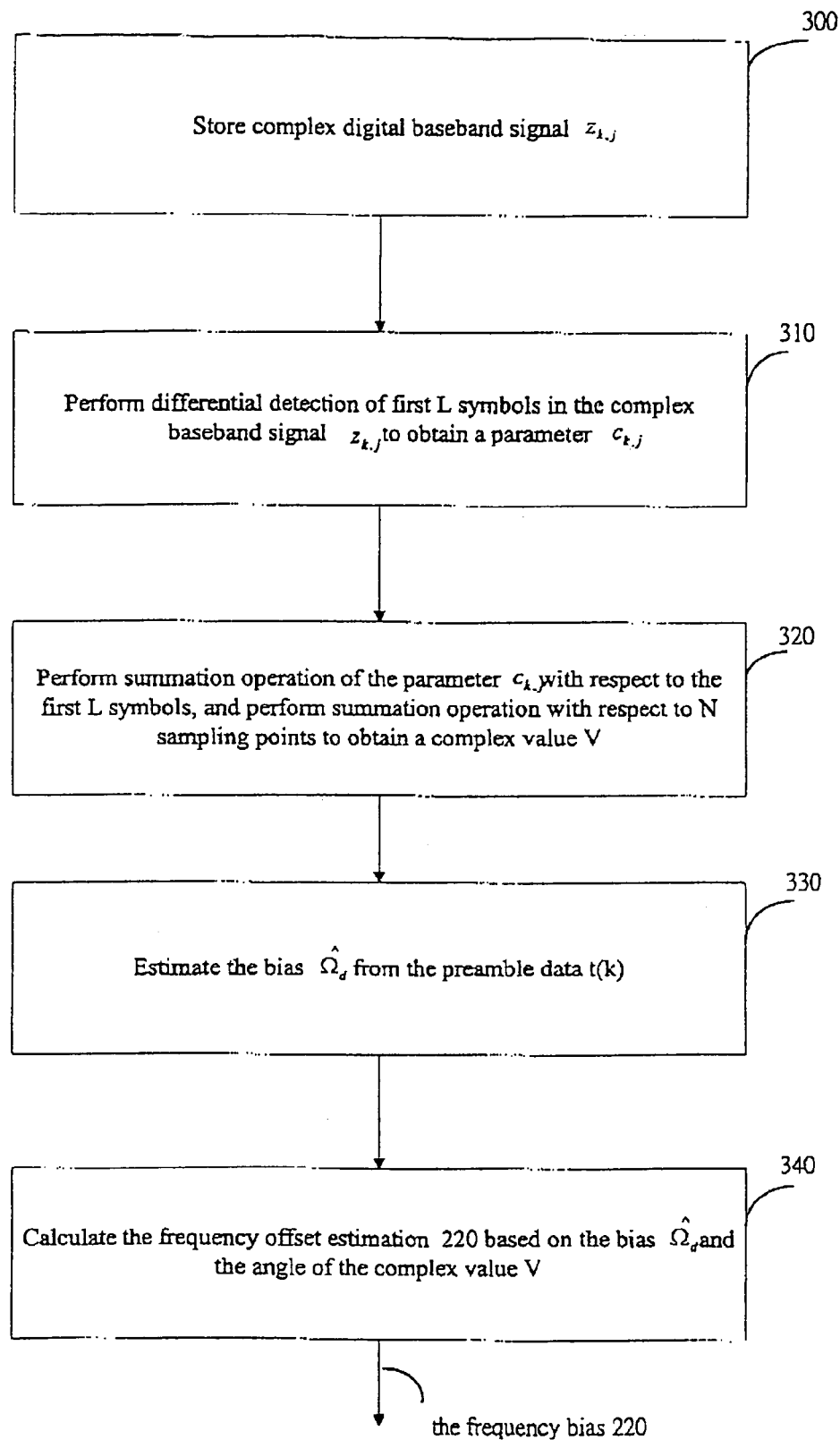
FIG. 3 illustrates the flowchart of the operation of the carrier synchronization circuit.

In one exemplar aspect of the present invention, the carrier synchronization circuit 210 generates the frequency offset estimation $\hat{\Omega}_\Delta$ 220 by performing the following steps shown in FIG. 3. Fist in step 300, the carrier synchronization circuit 210 stores the first L complex baseband signal $z_{k,j}$ 200, where L is a predetermined number, then step 310 the carrier synchronization circuit 210 performs one-bit differential detection over the L symbols in the complex baseband signal $z_{k,j}$ to obtain a parameter $c_{k,j}$, step 320 performs summation operation of the parameter $c_{k,j}$, with respect to the L symbols, and performs summation operation with respect to N sampling points to obtain a complex value V. Step 330 estimates a bias $\Omega_d$ based on the preamble data t(k) defined in the GFSK system, it is noted that step 330 can be executed before step 310 to get the bias $\Omega_d$ in advance. Step 340 calculates the frequency offset estimation $\hat{\Omega}_\Delta$ 220 based on the bias $\Omega_d$ and the angle of the complex value V.

In one preferred embodiment of the present invention, the carrier synchronization circuit 210 stores the complex baseband signal $z_{k,j}$ 200 in step 300. In step 310, calculates $c_{k,j}=z_{k+1,j}z_{k,j}^*$, wherein the $z_{k,j}^*$ is the conjugate complex number of $z_{k,j}$. In step 320, obtain V by summation of $c_{k,j}$ over L and N, wherein L is a predetermined number, step 330 estimate the bias from the preamble data t(k). $\hat{\Omega}_d$ is determined by $N_1, N_2, N_3, N_4$ and h, $N_1$ representing number of occurrences of $b_k=b_{k+1}=1$, $N_2$ representing number of occurrences of $b_k=b_{k+1}=-1$, $N_3$ representing number of occurrences of $b_k=1$, $b_{k+1}=-1$, $N_4$ representing number of occurrences of $b_k=-1$, $b_{k+1}=1$, $b_k$ is a value of a kth symbol of the preamble data t(k), h is the modulation index of the GFSK communication system.

Figure 4:
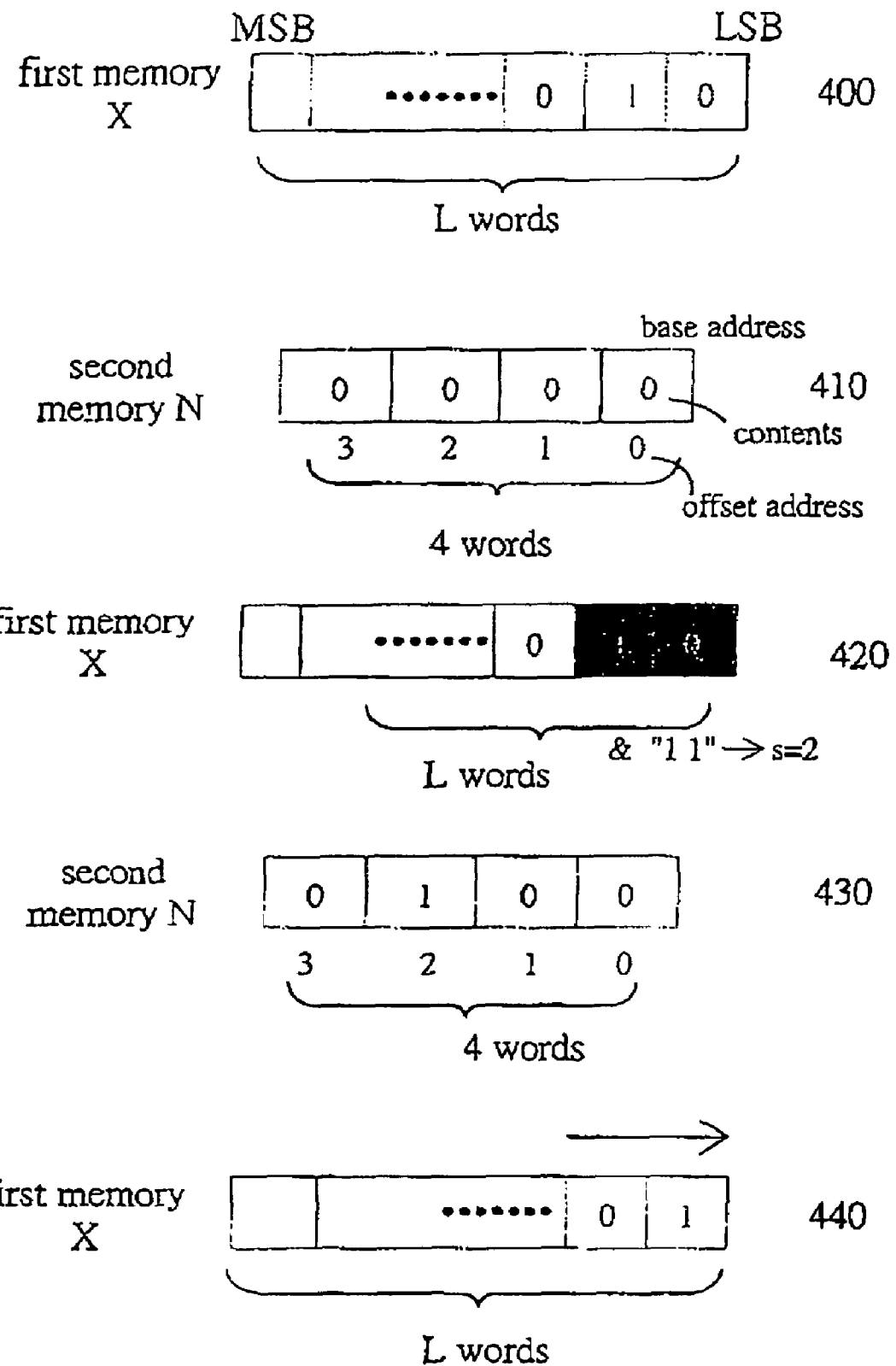
FIG. 4 illustrates the mechanism of finding $N_1$, $N_2$, $N_3$, $N_4$.

$N_1, N_2, N_3, N_4$ can be obtained as followed, please refer to FIG. 4, store a first L symbols of the preamble data t(k) in a first memory X of L words 400 (L is a predetermined number), provide a second memory N 410 having a first word, a second word, a third word and a fourth word, each word with an initial value of 0 and having an address comprise of base address and an offset address, then repeating the following steps for L-1 times: (1) obtaining s by retrieving last 2 bits of a data in memory X and do "and" operation with "11" (shown in 420); (2) adding 1 to the content of one of the first word, the second word, the third word and the fourth word which its offset address equaling to s (shown in 420); (3) shifting the data in memory X right by one bit (as in 440). After the repeating steps are done, obtain $N_1, N_2, N_3, N_4$ by retrieving contents of the first word, the second word, the third word and the fourth word.

Finally, step 340 obtain the frequency offset estimation $\hat{\Omega}_\Delta$ 220 by removing $\hat{\Omega}_d$ from arg(V) and normalized by T, wherein arg(V) is an angle of V, T is a symbol time.

Therefore, this invention estimates and removes the bias embedded in the preamble data t(k). And this invention can be applied to all of communication systems as long as the preamble introduces a bias.

Figure 5:
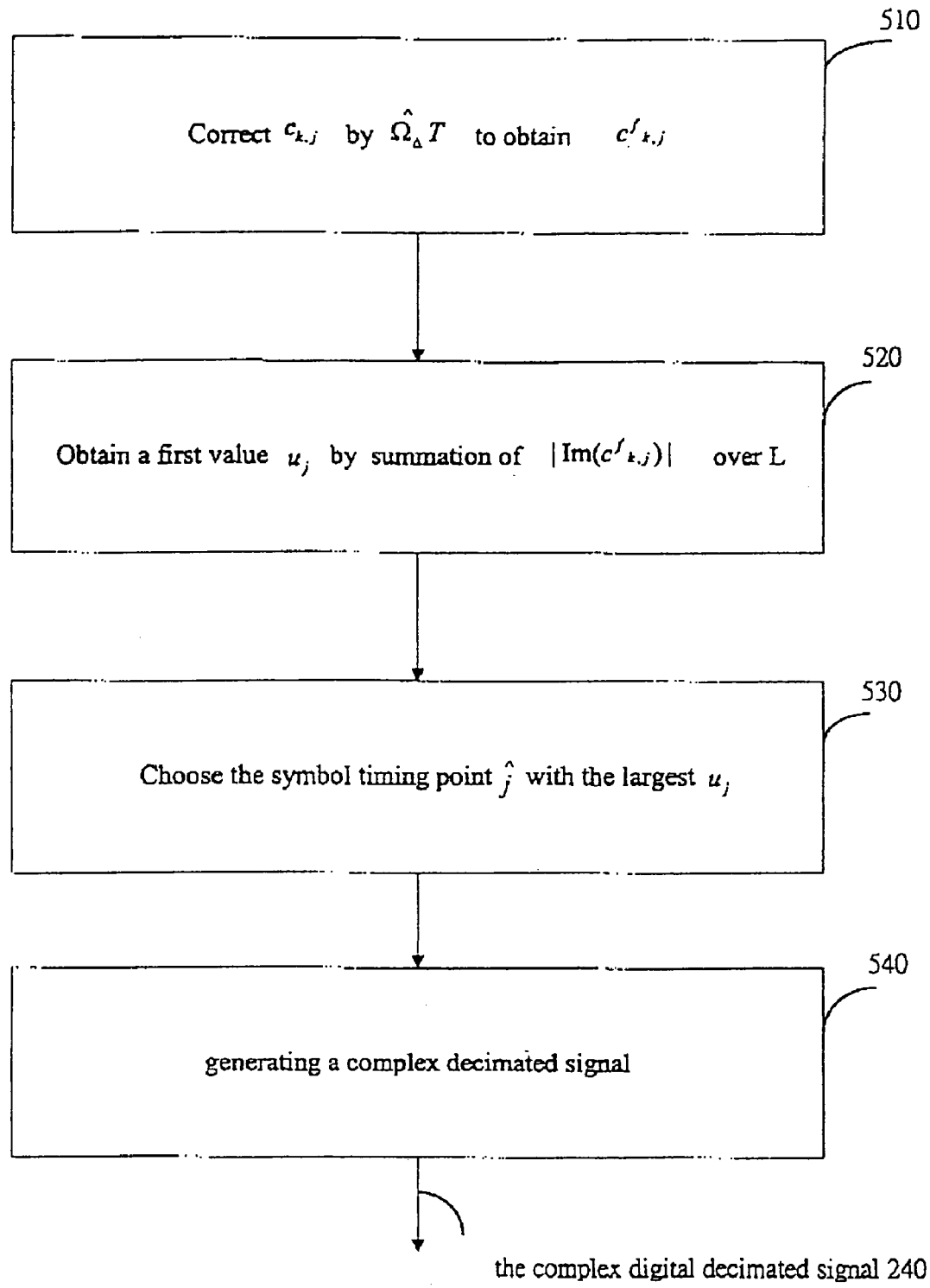
FIG. 5 illustrates the flowchart of the operation of the clock synchronization circuit.

In one aspect of the present invention, wherein the clock synchronization circuit 230 generates a complex digital decimated signal $z_{k,\hat{j}}$ 240 by estimating a sampling point $\hat{j}$ and performing the following steps. Please refer to FIG. 5. Step 510 corrects $c_{k,j}$ based on $\hat{\Omega}_\Delta T$ to obtain $c^f_{k,j}$, then in Step 520 obtains a first value $u_j$ by summation of $|\text{Im}(c^f_{k,j})|$ over L, wherein L is a predetermined number. In step 530, chooses the symbol timing point $\hat{j}$ with the largest $u_j$ by $$\hat{j} = \arg\{\max_j u_j\};$$

step 540 outputs the complex digital decimated signal $z_{k,\hat{j}}$ 240.

In the past, the symbol timing is obtained by calculating $c^f_{i,j}=c_{k,j}\cdot\exp(-j\cdot\hat{\Omega}_\Delta T)$ at first, wherein $c_{k,j}=z_{k+1,j}z_{k,j}^*$, $z_{k,j}^*$ is the conjugate complex number of $z_{k,j}$. Then obtains $u_j$ by summation of $|\text{Im}(c^f_{k,j})|$ over L, L is a predetermined number. This present invention simplifies the operation by obtaining a first value A and a second value B by $A=C\cos(\hat{\Omega}_\Delta T)$, $B=C\sin(\hat{\Omega}_\Delta T)$, wherein C is a constant, the obtain the value $u_j$ by summation of $|\text{Im}(c_{k,j})*A+\text{Re}(c_{k,j})*B|$ over L.

Figure 6:
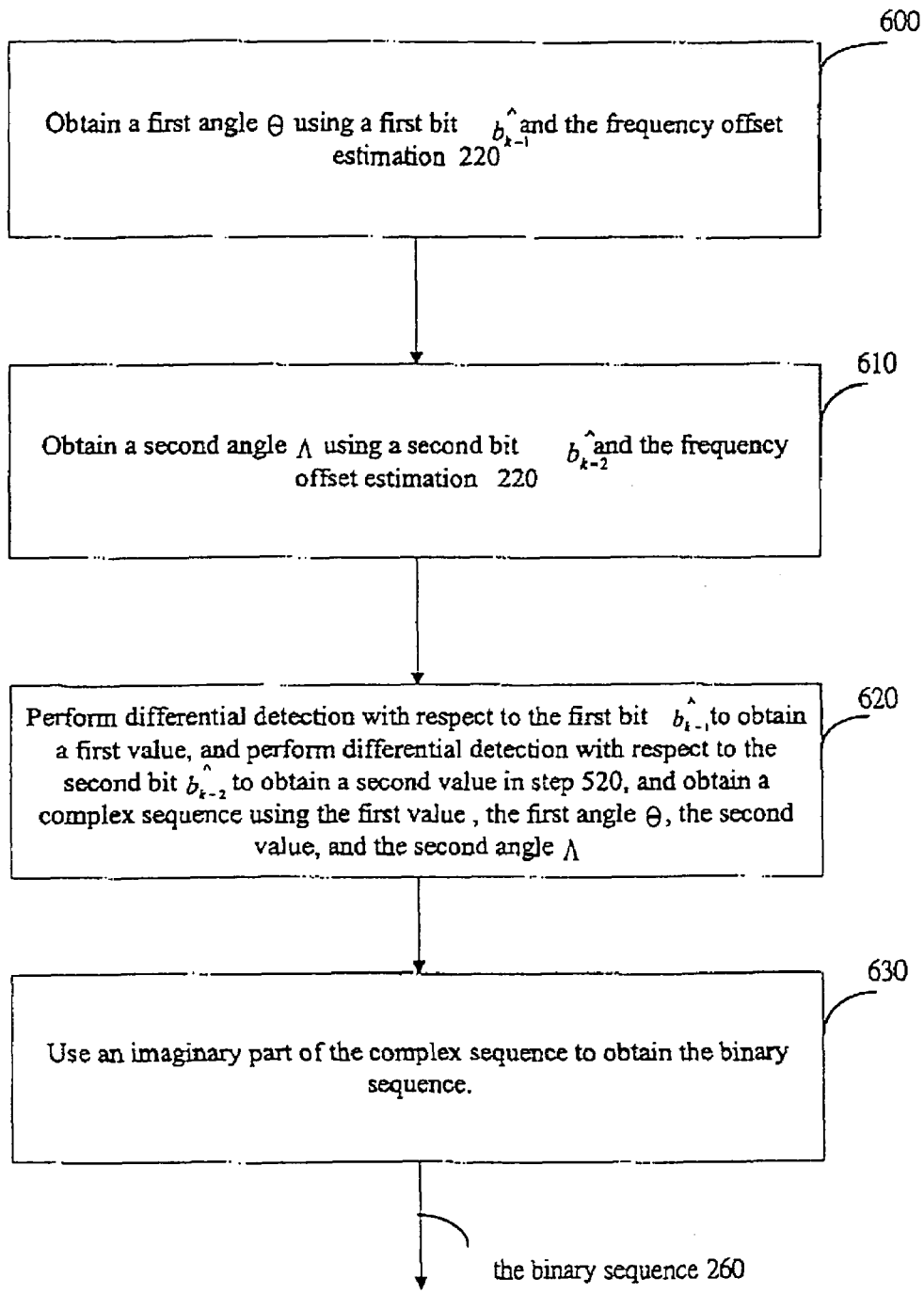
FIG. 6 illustrates the flowchart of the operation of the demodulation circuit.

Please refer to FIG. 6, in one aspect of the present invention, the demodulation circuit 250 demodulates the complex digital decimated signal $z_{k,\hat{j}}$ to generate the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$, and performs the following steps: Step 600 obtains a first angle $\theta$ using a first bit $\hat{b}_{k-1}$ and the frequency offset estimation $\hat{\Omega}_\Delta$ 220. Step 610 obtains a second angle $\Lambda$ using a second bit $\hat{b}_{k-2}$ and the frequency offset estimation $\hat{\Omega}_\Delta$ 220; Perform one-bit differential detection with respect to the first bit $\hat{b}_{k-1}$ to obtain a first value, and perform two-bit differential detection with respect to the second bit $\hat{b}_{k-2}$ to obtain a second value in step 620, and obtain a complex sequence using the first value, the first angle $\theta$, the second value, and the second angle $\Lambda$. Finally, step 630 obtains a binary sequence $b(k)=\{\hat{b}_0, \hat{b}_1, \hat{b}_2, \ldots, \hat{b}_{k-2}, \hat{b}_{b-1}, \hat{b}_k, \hat{b}_{k+1}, \ldots\}$ using an imaginary part of the complex sequence.

In one preferred embodiment of the invention. Obtaining an estimated binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ can be implemented by the following equations: obtain a first angle $\theta$ by $\Theta=C_2\hat{\Omega}_\Delta T-h_{k-1}\cdot\pi h\delta$; obtain a second angle $\Lambda$ by $$\Lambda = C_3\hat{\Omega}_\Delta T + \begin{cases} -\pi h + 2\delta\pi h & b_{k-2}=0, b_{k-1}=1 \\ \pi h - 2\delta\pi h & b_{k-2}=1, b_{k-1}=0, \\ -\pi h\cdot b_{k-1} & \text{otherwise} \end{cases}$$

wherein the parameter h is the modulation index defined in GFSK system, $$\delta = \frac{\int_{-T}^{0} p(t)dt}{\int_{-\infty}^{\infty} p(t)dt},$$

which is derived from the a Gaussian function p(t) defined in the GFSK communication system; then obtain the estimated binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by wherein $C_1, C_2, C_3$ are constants.

Figure 7:
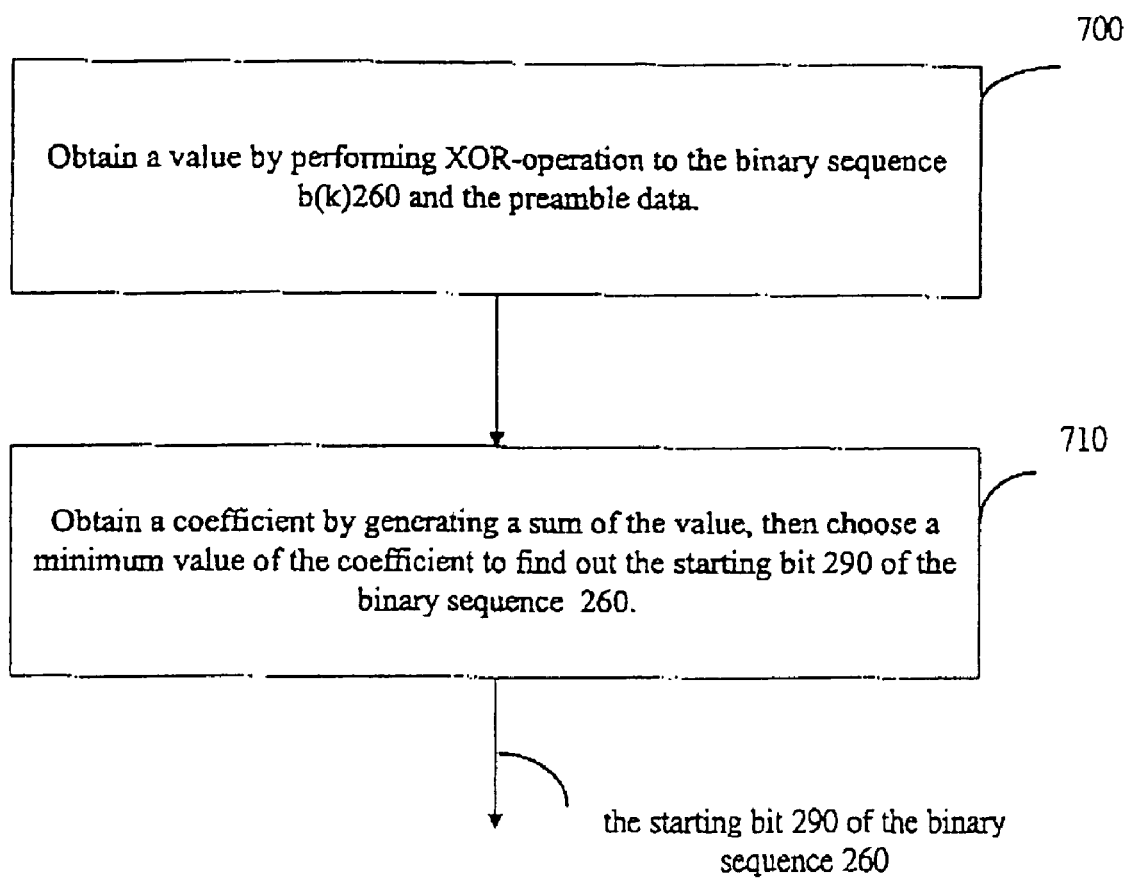
FIG. 7 illustrates the flowchart of the operation of the frame synchronization circuit.

In another aspect of the present invention, the frame synchronization circuit 280 obtains a starting bit 290 of the binary sequence b(k)={ƀ₀, ƀ₁, ƀ₂, . . . , ƀ_{k-2}, ƀ_{k-1}, ƀ_k, ƀ_{k+1}, . . . } 260 by performing the following steps shown in FIG. 7. It should be noted that the binary sequence b(k)={ƀ₀, ƀ₁, ƀ₂, . . . , ƀ_{k-2}, ƀ_{k-1}, ƀ_k, ƀ_{k+1}, . . . } 260 used herein is limited to unipolar binary sequence having values of {1, 0} in order to perform the XOR operation afterwards. In response to the binary sequence b(k)={ƀ₀, ƀ₁, ƀ₂, . . . , ƀ_{k-2}, ƀ_{k-1}, ƀ_k, ƀ_{k+1}, . . . } 260 and the preamble data t(k) in the complex digital signal 200, step 700 obtains a value by performing XOR-operation to the binary sequence b(k)={ƀ₀, ƀ₁, ƀ₂, . . . , ƀ_{k-2}, ƀ_{k-1}, ƀ_k, ƀ_{k+1}, . . . } 260 and the preamble data t(k). Step 710 obtains a series of coefficients by generating a sum of the value, then choose a minimum value of the series of coefficients to find out the starting bit 290 of the binary sequence b(k)={ƀ₀, ƀ₁, ƀ₂, . . . , ƀ_{k-2}, ƀ_{k-1}, ƀ_k, ƀ_{k+1}, . . . } 260. FIG. 7 can be further implemented by obtaining a series of coefficients coff(k) by summation of b(k+n)(xor)t(k) over M, wherein M is number of bits, wherein (XOR) is an exclusive-or operation; and choose the starting bit 290 of the binary sequence b(k)={ƀ₀, ƀ₁, ƀ₂, . . . , ƀ_{k-2}, ƀ_{k-1}, ƀ_k, ƀ_{k+1}, . . . } 260 by choosing the minimum of the series of coefficient by min(coff(k)).

In this example, because the present invention uses (XOR) operation instead of multiplication, thus the invention uses minimum instead of maximum operation in finding the starting bit 290 of the binary sequence b(k)={ƀ₀, ƀ₁, ƀ₂, . . . , ƀ_{k-2}, ƀ_{k-1}, ƀ_k, ƀ_{k+1}, . . . } 260. This method can be applied to all the systems as long as the bit stream information is in the form of unipolar binary (0, 1) sequence.

In the foregoing specification the invention has been described with reference to specific exemplar aspects thereof. It will, however, be evident that various modification and changes may be made to thereto without departing from the broader spirit and scope of the invention. The specification and drawings are, accordingly, to be regarded in an illustrative rather than restrictive sense.

What is claimed is:

1. A baseband circuit for estimating a binary sequence b(k)={ƀ₀, ƀ₁, ƀ₂, . . . , ƀ_{k-2}, ƀ_{k-1}, ƀ_k, ƀ_{k+1}, . . . } in a GFSK (Gaussian Frequency Shift Keying) communication system, comprising:

a carrier synchronization circuit, responsive to a complex baseband signal $z_{k,j}$ and a preamble data t(k), for generating a frequency offset estimation $\hat{\Omega}_\Delta$, wherein $z_{k,j}$ representing a j-th sample of a k-th symbol of a received data, $0 \leq j \leq N-1$, N representing samples per symbol;

a clock synchronization circuit, responsive to the complex baseband signal $z_{k,j}$ and the frequency offset estimation $\hat{\Omega}_{66}$, for generating a complex digital decimated signal $z_{k,\hat{j}}$ by estimating a sampling point $\hat{j}$;

a demodulation circuit with decision feedback, responsive to the complex digital decimated signal $z_{k,\hat{j}}$, the frequency offset estimation $\hat{\Omega}_\Delta$, a first bit $ƀ_{k-1}$ and a second bit $ƀ_{k-2}$, for demodulating the complex digital decimated signal $z_{k,\hat{j}}$ to generate the binary sequence b(k)={ƀ₀, ƀ₁, ƀ₂, . . . , ƀ_{k-2}, ƀ_{k-1}, ƀ_k, ƀ_{k+1}, . . . }; and a frame synchronization circuit, responsive to the binary sequence b(k)={ƀ₀, ƀ₁, ƀ₂, . . . , ƀ_{k-2}, ƀ_{k-1}, ƀ_k, ƀ_{k+1}, . . . } and the preamble data t(k), for obtaining a starting bit ƀ_k of the binary sequence b(k)={ƀ₀, ƀ₁, ƀ₂, . . . , ƀ_{k-2}, ƀ_{k-1}, ƀ_k, ƀ_{k+1}, . . . }.

2. A baseband circuit for estimating a binary sequence b(k)={ƀ₀, ƀ₁, ƀ₂, . . . , ƀ_{k-2}, ƀ_{k-1}, ƀ_k, ƀ_{k+1}, . . . } in Gaussian Frequency Shift communication system, comprising:

a carrier synchronization circuit for generating a frequency offset estimation $\hat{\Omega}_\Delta$ by:

storing a complex baseband signal $z_{k,j}$, wherein $z_{k,j}$ representing a j-th sample of a k-th symbol of a received data, $0 \leq j \leq N-1$, N representing samples per symbol;

performing one-bit differential detection over L symbols in the complex baseband signal $z_{k,j}$ to obtain a parameter $c_{k,j}$, wherein L is a predetermined number;

performing summation operation of the $c_{k,j}$ with respect to the first L symbols, and performing summation operation with respect to N sampling points, to obtain a complex value V;

estimating a bias $\hat{\Omega}_d$ based on a preamble data t(k);

calculating the frequency offset estimation $\hat{\Omega}_\Delta$ based on the bias $\hat{\Omega}_d$ and an angle of the complex value V;

a clock synchronization circuit for generating a complex digital decimated signal $z_{k,\hat{j}}$ by estimating a sampling point $\hat{j}$ using the frequency offset estimation $\hat{\Omega}_\Delta$ and the complex baseband signal $z_{k,j}$; and a demodulation circuit, responsive to the complex digital decimated signal $z_{k,\hat{j}}$ and the frequency offset estimation $\hat{\Omega}_\Delta$ for demodulating the complex digital decimated signal $z_{k,\hat{j}}$ to generate the binary sequence b(k)={ƀ₀, ƀ₁, ƀ₂, . . . , ƀ_{k-2}, ƀ_{k-1}, ƀ_k, ƀ_{k+1}, . . . }.

3. The circuit of claim 2, wherein $\hat{\Omega}_d$ is further determined by $N_1, N_2, N_3, N_4$ and h, wherein $N_1$ representing number of occurrences of $b_k=b_{k+1}=1$, $N_2$ representing number of occurences of $b_k=b_{k+1}=-1$, $N_3$ representing number of occurrences of $b_k=1, b_{k+1}=-1$, $N_4$ representing number of occurrences of $b_k=-1$, $b_k$ is a value of a kth symbol of the preamble data t(k), h is a modulation index of the GFSK communication system.

4. The circuit of claim 3, wherein $N_1, N_2, N_3, N_4$ are determined by:

storing a first L symbols of the preamble data t(k) in a first memory X of L words, L is a predetermined number;

providing a second memory N having a first word, a second word, a third word and a fourth word, each word having a base address and an offset address with an initial value of 0;

repeating the following steps for L-1 times:

(40.1) obtaining s by retrieving last 2 bits of a data in memory X and do "and" operation with "11";

(40.2) adding 1 to a content of one of the first word, the second word, the third word and the fourth word which has offset address equaling to s;

(40.3) shifting the data in memory X right by one bit;

obtaining $N_1, N_2, N_3, N_4$ by retrieving contents of the first word, the second word, the third word and the fourth word.

5. The circuit of claim 2, wherein $\hat{\Omega}_\Delta$ is further determined by removing $\hat{\Omega}_d$ from arg(V) and normalized by T, wherein arg(V) is an angle of V, T is a symbol time.

6. The circuit of claim 2, wherein the demodulation circuit is further responsive to a first bit $ƀ_{k-1}$ and a second bit $ƀ_{k-2}$.

7. A baseband circuit for estimating a binary sequence b(k)={ƀ₀, ƀ₁, ƀ₂, . . . , ƀ_{k-2}, ƀ_{k-1}, ƀ_k, ƀ_{k+1}, . . . } in a GFSK (Gaussian Frequency Shift Keying) communication system, comprising:

a carrier synchronization circuit for generating a frequency offset estimation $\hat{\Omega}_\Delta$ and performing one-bit differential detection of a first L symbols in a complex baseband signal $z_{k,j}$ to obtain a parameter $c_{k,j}$, wherein L is a predetermined number, and $z_{k,j}$ representing a j-th sample of a k-th symbol of a received data, $0 \leq j \leq N-1$, and N represents samples per symbol;

a clock synchronization circuit for generating a complex digital decimated signal $z_{k,\hat{j}}$ by:

correcting $c_{k,j}$ based on $\hat{\Omega}_\Delta T$ to obtain $c^f_{k,j}$; wherein T is a symbol obtaining a first value $u_j$ by summation of $|Im(c^f_{k,j})|$ over L; and choosing the symbol timing $\hat{j}$ with the largest $u_j$ by $$\hat{j} = \arg\{\max_j u_j\};$$

a demodulation circuit, responsive to the complex digital decimated signal $z_{k,\hat{j}}$ and the frequency offset estimation $\hat{\Omega}_\Delta$ for demodulating the complex digital decimated signal $z_{k,\hat{j}}$ to generate the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$.

8. The circuit of claim 7, wherein the first value $u_j$ is further determined by:

obtaining a first value A and a second value B by A=C $\cos(\hat{\Omega}_\Delta T)$, B=C $\sin(\hat{\Omega}_\Delta T)$, wherein C is a constant;

obtaining a third value $u_j$ by summation of $|Im(c_{k,j})*A + Re(c_{k,j})(B)|$ over L, wherein L is a predetermined number.

9. The circuit of claim 7, wherein the demodulation circuit is further responsive to a first bit $\hat{b}_{k-1}$ and a second bit $\hat{b}_{k-2}$.

10. A baseband circuit for estimating a binary sequence $b(k)\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ in a GFSK (Gaussian Frequency Shift Keying) communication system, comprising:

a carrier synchronization circuit, responsive to a complex baseband signal $z_{k,j}$ and a preamble data t(k), for generating a frequency offset estimation $\hat{\Omega}_\Delta$, wherein $z_{k,j}$ representing a j-th sample of a k-th symbol of a received data, $0 \leq j \leq N-1$, N representing samples per symbol;

a clock synchronization circuit, responsive to the complex baseband signal $z_{k,j}$ and the estimated frequency offset $\hat{\Omega}_\Delta$, for generating a complex digital decimated signal $z_{k,\hat{j}}$ by estimating a sampling point $\hat{j}$; and a demodulation circuit for demodulating the complex digital decimated signal $z_{k,\hat{j}}$ to generate the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by:

obtaining a first angle $\theta$ using a first bit $\hat{b}_{k-1}$ and the frequency offset estimation $\hat{\Omega}_\Delta$;

obtaining a second angle $\Lambda$ using a second bit $\hat{b}_{k-2}$ and the frequency offset estimation $\hat{\Omega}_\Delta$;

performing one-bit differential detection with respect to the first bit $\hat{b}_{k-1}$ to obtain a first value, and performing two-bit differential detection with respect to the second bit $\hat{b}_{k-2}$ to obtain a second value, obtaining a complex sequence using the first value, the first angle $\Theta$, the second value, and the second angle $\Lambda$;

obtaining the binary sequence $b(k)\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ using an imaginary part of the complex sequence.

11. The circuit of claim 10, wherein $\Theta$ is obtained by $\Theta = C_2 \hat{\Omega}_\Delta T - \hat{b}_{k-1} \cdot \pi h \delta$, h is a demodulation index in the GFSK communication system, $$\delta = \frac{\int_{-T}^{0} p(t) dt}{\int_{-\infty}^{\infty} p(t) dt},$$

is a Gaussian function, T is a symbol time;

$\Lambda$ is obtained $$\Lambda = C_3 \hat{\Omega}_\Delta T + \begin{cases} -\pi h + 2\delta\pi h & \hat{b}_{k-2} = 0, \hat{b}_{k-1} = 1 \\ \pi h - 2\delta\pi h & \hat{b}_{k-2} = 1, \hat{b}_{k-1} = 0; \\ -\pi h \cdot \hat{b}_{k-1} & \text{otherwise} \end{cases}$$

$b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ is obtained by $$\hat{b}_k = sgn[Im(z_{k+1,\hat{j}} \cdot z_{k,\hat{j}}^* \cdot e^{j\Theta} + C_1 \cdot z_{k+1,\hat{j}} \cdot z_{k-1,\hat{j}} \cdot e^{j\Lambda})],$$

wherein $C_1$, $C_2$, $C_3$ are constants, $z_{k,\hat{j}}^*$ is a conjugate complex number of $z_{k,\hat{j}}$, and "sgn" represents taking sign of a quantity by "0" for a negative sign and "1" for a positive sign and zero.

12. A baseband circuit for estimating a unipolar binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ having values of $\{0, 1\}$ in a GFSK (Gaussian Frequency Shift Keying) communication system, comprising:

a demodulation circuit for generating a binary sequence $b(k)=\{\hat{b}_0, \hat{b}_1, \hat{b}_2, \ldots, \hat{b}_{b-2}, \hat{b}_{k-1}, \hat{b}_k, \hat{b}_{k+1}, \ldots\}$; and a frame synchronization circuit for obtaining a starting bit $\hat{b}_{\hat{k}}$ of the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by:

responsive to the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ and a preample data t(k), obtaining a value by performing XOR-operation to the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ and the preamble data t(k);

obtaining a series of coefficients by generating a sum of the values; and choosing the starting bit $\hat{b}_{\hat{k}}$ of the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by choosing a minimum value of the series of coefficients.

13. A baseband circuit for estimating a unipolar binary sequence $b(k)=\{\hat{b}_0, \hat{b}_1, \hat{b}_2, \ldots, \hat{b}_{l-2}, \hat{b}_{l-1}, \hat{b}_k, \hat{b}_{k+1}, \ldots\}$ having values of $\{0, 1\}$ in a GFSK (Gaussian Frequency Shift Keying) communication system, comprising:

a carrier synchronization circuit for generating a frequency offset estimation $\hat{\Omega}_\Delta$ by:

storing a complex baseband signal $z_{k,j}$, wherein $z_{k,j}$ representing a j-th sample of a k-th symbol of a received data, $0 \leq j \leq N-1$, N representing samples per symbol;

calculating $c_{k,j} = z_{k+1,j} z_{k,j}^*$, wherein the $z_{k,j}^*$ is the conjugate complex number of $z_{k,j}$;

obtaining V by summation of $c_{k,j}$ over L and N, wherein L is a predetermined number; and obtaining the frequency offset estimation $\hat{\Omega}_\Delta$ by removing $\hat{\Omega}_d$ from arg(V) and normalized by T, wherein arg(V) is an angle of V, T is a symbol time, $\hat{\Omega}_d$ is determined by $N_1$, $N_2$, $N_3$, $N_4$ and h, $N_1$ representing number of occurrences of $\hat{b}_k = \hat{b}_{k+1} = 1$, $N_2$ representing number of occurrences of $\hat{b}_k = \hat{b}_{k+1} = -1$, $N_3$ representing number of occurrences of $\hat{b}_k = 1$, $\hat{b}_{k+1} = -1$, $N_4$ representing number of occurrences of $\hat{b}_k - 1$, $b_{k+1}=1$, $b_k$ is a value of a kth symbol of the preamble data t(k), h is a modulation index of the GFSK communication system;

a clock synchronization circuit for generating a complex digital decimated signal $z_{k,\hat{j}}$ by:

obtaining a first value A and a second value B by $A=C \cos(\hat{\Omega}_\Delta T)$, $B=C \sin(\hat{\Omega}_\Delta T)$; wherein C is a constant;

obtaining a third value $u_j$ by summation of $|Im(c_{k,j})^*A + Re(c_{k,j})^*B|$ over L; and choosing a symbol timing $\hat{j}$ with the largest $u_j$ by $$\hat{j} = \arg\{\max_j u_j\};$$

a demodulation circuit for demodulating the complex digital decimated signal $z_{k,\hat{j}}$ to generate the binary sequence $b(k)=\{b_0, b_1, b_2, \ldots, b_{k-2}, b_{k-1}, b_k, b_{k+1}, \ldots\}$ by:

obtaining a first angle $\theta$ by $\Theta = C_2\hat{\Omega}_\Delta T - b_{k-1}\cdot\pi h\delta$, wherein h is a demodulation index in the GFSK communication system, $$\delta = \frac{\int_{-T}^{0} p(t)dt}{\int_{-\infty}^{\infty} p(t)dt},$$

is a Gaussian function;

obtaining a second angle $\Lambda$ by $$\Lambda = C_3\hat{\Omega}_\Delta T + \begin{cases} -\pi h + 2\delta\pi h & b_{k-2}=0, b_{k-1}=1 \\ \pi h - 2\delta\pi h & b_{k-2}=1, b_{k-1}=0; \text{ and} \\ -\pi h \cdot b_{k-1} & \text{otherwise} \end{cases}$$

obtaining $b(k)=\{b_0, b_1, b_2, \ldots, b_{k-2}, b_{k-1}, b_k, b_{k+1}, \ldots\}$ by $b_k = sgn[Im(z_{k+1,\hat{j}}\cdot z_{k,\hat{j}}^*\cdot e^{j\Theta} + C_1 z_{k+1,\hat{j}}\; z_{k-1,\hat{j}}^*\cdot e^{j\Lambda})],$ wherein $C_1$, $C_2$, $C_3$ are constants, $z_{k,\hat{j}}^*$ is the conjugate complex number of $z_{k,\hat{j}}$, and "sgn" represents taking sign of a quantity by "0" for a negative sign and "1" for a positive sign and zero;

a frame synchronization circuit for obtaining a starting bit $b_{\bar{k}}$ of the binary sequence $b(k)=\{b_0, b_1, b_2, \ldots, b_{k-2}, b_{k-1}, b_k, b_{k+1}, \ldots\}$ by:

responsive to the binary sequence $b(k)=\{b_0, b_1, b_2, \ldots, b_{k-2}, b_{k-1}, b_k, b_{k+1}, \ldots\}$ and the preamble data t(k), obtaining a series of coefficient coff(k) by summation of b(l+n)(xor)t(k) over M, wherein M is number of bits; and choosing the starting bit $b_{\bar{k}}$ of the binary sequence $b(k)=\{b_0, b_1, b_2, \ldots, b_{k-2}, b_{k-1}, b_k, b_{k+1}, \ldots\}$ by min(coff(k)).

14. A method for estimating a binary sequence $b(k)=\{b_0, b_1, b_2, \ldots, b_{k-2}, b_{k-1}, b_k, b_{k+1}, \ldots\}$ in a GFSK (Gaussian Frequency Shift Keying) communication system, comprising the following steps:

(14.1) responsive to a complex baseband signal $z_{k,j}$ and a preamble data t(k), generating a frequency offset estimation $\hat{\Omega}_\Delta$, wherein $z_{k,j}$ representing a j-th sample of a k-th symbol of a received data, $0 \leq j \leq N-1$, N representing samples per symbol;

(14.2) responsive to the complex baseband signal $z_{k,j}$ and the frequency offset estimation $\hat{\Omega}_\Delta$, generating a complex digital decimated signal $z_{k,\hat{j}}$ by estimating a sampling point $\hat{j}$;

(14.3) responsive to the complex digital decimated signal $z_{k,\hat{j}}$, the frequency offset estimation $\hat{\Omega}_\Delta$, a first bit $b_{k-1}$ and a second bit $b_{k-2}$, demodulating the complex digital decimated signal $z_{k,\hat{j}}$ to generate the binary sequence $b(k)=\{b_0, b_1, b_2, \ldots, b_{k-2}, b_{k-1}, b_k, b_{k+1}, \ldots\}$; and (14.4) frame synchronization circuit, responsive to the binary sequence $b(k)=\{b_0, b_1, b_2, \ldots, b_{k-2}, b_{k-1}, b_k, b_{k+1}, \ldots\}$ and the preamble data t(k), for obtaining a starting bit $b_{\bar{k}}$ of the binary sequence $b(k)=\{b_0, b_1, b_2, \ldots, b_{k-2}, b_{k-1}, b_k, b_{k+1}, \ldots\}$.

15. A method for estimating a binary sequence $b(k)=\{b_0, b_1, b_2, \ldots, b_{k-2}, b_{k-1}, b_k, b_{k+1}, \ldots\}$ in a GFSK (Gaussian Frequency Shift Keying) communication syste, comprising the following steps:

(15.1) obtaining a frequency offset estimation $\hat{\Omega}_\Delta$ by performing the following steps:

a. storing a first L complex baseband signal $z_{k,j}$, wherein $z_{k,j}$ representing a j-th sample of a k-th symbol of a received data, $0 \leq j \leq N-1$, N representing samples per symbol; and L is a predetermined number;

b. performing one-bit differential detection of a first L symbols in the complex baseband signal $z_{k,j}$ to obtain a parameter $c_{k,j}$;

c. performing summation operation of the $c_{k,j}$ with respect to the first L symbols, and performing summation operation with respect to N sampling points, to obtain a complex value V;

d. estimating a bias $\hat{\Omega}_d$ based on a preamble data t(k); and e. calculating the frequency offset estimation $\hat{\Omega}_\Delta$ based on the bias $\hat{\Omega}_d$ and an angle of the complex value V;

(15.2) generating a complex digital decimated signal $z_{k,\hat{j}}$ by estimating a sampling point $\hat{j}$ using the frequency offset estimation $\hat{\Omega}_\Delta$ and the complex baseband signal $z_{k,j}$; and (15.3) responsive to the complex digital decimated signal $z_{k,\hat{j}}$ and the frequency offset estimation $\hat{\Omega}_\Delta$, demodulating the complex digital decimated signal $z_{k,\hat{j}}$ to generate the binary sequence $b(k)=\{b_0, b_1, b_2, \ldots, b_{k-2}, b_{k-1}, b_k, b_{k+1}, \ldots\}$.

16. The method of claim 15, wherein $\hat{\Omega}_d$ is further determined by $N_1$, $N_2$, $N_3$, $N_4$ and h, $N_1$ representing number of occurrences of $b_k = b_{k+1} = 1$, $N_2$ representing number of occurrences of $b_k = b_{k+1} = -1$, $N_3$ representing number of occurrences of $b_k = 1$, $b_{k+1} = -1$, $N_4$ representing number of occurrences of $b_k = -1$, $b_k$ is a value of a kth symbol of the preamble data t(k), h is a modulation index of the GFSK communication system.

17. The method of claim 16, wherein $N_1$, $N_2$, $N_3$, $N_4$ are determined by the following steps:

(17.1) storing a first L symbols of the preamble data t(k) in a first memory X of L words, wherein L is a predetermined number;

(17.2) providing a second memory N having a first word, a second word, a third word and a fourth word, each word having a base address and an offset address with an initial value of 0;

(17.3) repeating the following steps for L-1 times:

(170.1) obtaining s by retrieving last 2 bits of a data in memory X and do "and" operation with "11";

(170.2) adding 1 to a content of one of the first word, the second word, the third word and the fourth word which has offset address equaling to s;

(170.3) shifting the data in memory X right by one bit;

(17.4) obtaining $N_1$, $N_2$, $N_3$, $N_4$ by retrieving contents of the first word, the second word, the third word and the fourth word.

18. The method of claim 15, wherein $\hat{\Omega}_\Delta$ is further determined by removing $\hat{\Omega}_d$ from arg(V) and normalized by T, arg(V) is an angle of V, T is a symbol time.

19. The method of claim 15, wherein in the step (15.3), the generation of the binary sequence $b(k)=\{b_0, b_1, b_2, \ldots, b_{k-2}, b_{k-1}, b_k, b_{k+1}, \ldots\}$ is further responsive to a first bit $b_{k-1}$ and a second bit $b_{k-2}$.

20. A method for estimating a binary sequence $b(k)=\{b_0, b_1, b_2, \ldots, b_{k-2}, b_{k-1}, b_k, b_{k+1}, \ldots\}$ in a GFSK (Gaussian Frequency Shift Keying) communication system, comprising the following steps:

(20.1) generating a frequency offset estimation $\hat{\Omega}_\Delta$ and performing one-bit differential detection of a first L symbols in the complex baseband signal $z_{k,j}$ to obtain a parameter $c_{k,j}$, wherein $z_{k,j}$ represents a j-th sample of a k-th symbol of a received data, $0 \leq j \leq N-1$, N representing samples per symbol; and L is a predetermined number;

(20.2) generating a complex digital decimated signal $z_{k,\hat{j}}$ by:

correcting $c_{k,j}$ based on $\hat{\Omega}_\Delta T$ to obtain $c^f_{k,j}$, wherein T is a symbol time;

obtaining a first value $u_j$ by summation of $|Im(c^f_{k,j})|$ over L; and choosing a symbol timing $\hat{j}$ with the largest $u_j$ by $$\hat{j} = \arg\{\max_j u_j\};$$

(20.3) responsive to the complex digital decimated signal $z_{k,\hat{j}}$ and the frequency offset estimation $\hat{\Omega}_\Delta$, demodulating the complex digital decimated signal $z_{k,\hat{j}}$ to generate the binary sequence $b(k)=\{b_0, b_1, b_2, \ldots, b_{k-2}, b_{k-1}, b_k, b_{k+1}, \ldots\}$.

21. The method of claim 20, wherein the first value $u_j$ is further determined by:

obtaining a first value A and a second value B by $A=C \cos(\hat{\Omega}_\Delta T)$, $B=C \sin(\hat{\Omega}_\Delta T)$; wherein C is a constant;

obtaining a third value $u_j$ by summation of $|Im(c_{k,j})*A + Re(c_{k,j})*B|$ over L, wherein L is a predetermined number.

22. The method of claim 20, wherein the step (20.3) the generation of $b(k)=\{b_0, b_1, b_2, \ldots, b_{k-2}, b_{k-1}, b_k, b_{k+1}, \ldots\}$ further responsive to a first bit $b_{k-1}$ and a second bit $b_{k-2}$.

23. A method for estimating a binary sequence $b(k)=\{b_0, b_1, b_2, \ldots, b_{k-2}, b_{k-1}, b_k, b_{k+1}, \ldots\}$ in a GFSK (Gaussian Frequency Shift Keying) communication system, comprising the following steps:

(23.1) responsive to a complex baseband signal $z_{k,j}$ and a preamble data t(k), generating a frequency offset estimation $\hat{\Omega}_\Delta$, wherein $z_{k,j}$ representing a j-th sample of a k-th symbol of a received data, $0 \leq j \leq N-1$, N representing samples per symbol;

(23.2) responsive to the complex baseband signal $z_{k,j}$ and the estimated frequency offset $\hat{\Omega}_\Delta$, generating a complex digital decimated signal $z_{k,\hat{j}}$ by estimating a sampling point $\hat{j}$; and (23.3) demodulating the complex digital decimated signal $z_{k,\hat{j}}$ to generate the binary sequence $b(k)=\{b_0, b_1, b_2, \ldots, b_{k-2}, b_{k-1}, b_k, b_{k+1}, \ldots\}$ by:

a. obtaining a first angle θ using a first bit $b_{k-1}$ and the frequency offset estimation $\hat{\Omega}_\Delta$;

b. obtaining a second angle Λ using a second bit $b_{k-2}$ and the frequency offset estimation $\hat{\Omega}_\Delta$;

c. performing one-bit differential detection with respect to the first bit $b_{k-1}$ to obtain a first value, and performing two-bit differential detection with respect to the second bit $b_{k-2}$ to obtain a second value, obtaining a complex sequence using the first value, the first angle θ, the second value, and the second angle Λ;

d. obtaining the binary sequence $b(k)=\{b_0, b_1, b_2, \ldots, b_{k-2}, b_{k-1}, b_k, b_{k+1}, \ldots\}$ using an imaginary part of the complex sequence.

24. The method of claim 23, wherein the step (23.3), Θ is further obtained by $\Theta = C_2 \hat{\Omega}_\Delta T - b_{k-1} \cdot \pi h \delta$, h is a demodulation index in the GFSK communication system $$\delta = \frac{\int_{-T}^{0} p(t)dt}{\int_{-\infty}^{\infty} p(t)dt},$$

is a Gaussian function, T is a symbol time;

Λ is obtained by $$\Lambda = C_3 \hat{\Omega}_\Delta T + \begin{cases} -\pi h + 2\delta\pi h & b_{k-2}=0, b_{k-1}=1 \\ \pi h - 2\delta\pi h & b_{k-2}=1, b_{k-1}=0; \\ -\pi h \cdot b_{k-1} & \text{otherwise} \end{cases}$$

$b(k)=\{b_0, b_1, b_2, \ldots, b_{k-2}, b_{k-1}, b_k, b_{k+1}, \ldots\}$ is obtained by $$b_k = sgn[Im(z_{k+1,\hat{j}} \cdot z_{k,\hat{j}}^* \cdot e^{j\Theta} + C_1 \cdot z_{k+1,\hat{j}} \cdot z_{k-1,\hat{j}}^* \cdot e^{j\Lambda})],$$

wherein $C_1$, $C_2$, $C_3$ are constants, $z_{k,\hat{j}}^*$ is a conjugate complex number of $z_{k,\hat{j}}$, and "sgn" represents taking sign of a quantity by "0" for a negative sign and "1" for a positive sign and zero.

25. A method for estimating a unipolar binary sequence $b(k)=\{b_0, b_1, b_2, \ldots, b_{k-2}, b_{k-1}, b_k, b_{k+1}, \ldots\}$ having values of $\{0, 1\}$ in a Gaussian Frequency Shift Keying communication system, comprising the following steps:

(25.1) generating a binary sequence $b(k)=\{b_0, b_1, b_2, \ldots, b_{k-2}, b_{k-1}, b_k, b_{k+1}, \ldots\}$; and (25.2) obtaining a starting bit $b_{\tilde{k}}$ of the binary sequence $b(k)=\{b_0, b_1, b_2, \ldots, b_{k-2}, b_{k-1}, b_k, b_{k+1}, \ldots\}$ by:

a. responsive to the binary sequence $b(k)=\{b_0, b_1, b_2, \ldots, b_{k-2}, b_{k-1}, b_k, b_{k+1}, \ldots\}$ and a preamble data t(k), obtaining a value by performing XOR-operation to the binary sequence $b(k)=\{b_0, b_1, b_2, \ldots, b_{k-2}, b_{k-1}, b_k, b_{k+1}, \ldots\}$ and the preamble data t(k);

b. obtaining a series of coefficient by generating a sum of the values; and choosing the starting bit $b_{\tilde{k}}$ of the binary sequence $b(k)=\{b_0, b_1, b_2, \ldots, b_{k-2}, b_{k-1}, b_k, b_{k+1}, \ldots\}$ by choosing a minimum value of the series of coefficient.

26. A method for estimating a unipolar binary sequence $b(k)=\{b_0, b_1, b_2, \ldots, b_{k-2}, b_{k-1}, b_k, b_{k+1}, \ldots\}$ having values of {0, 1} in a Gaussian Frequency Shift Keying communication system, comprising the following steps:

(26.1) generating a frequency offset estimation $\hat{\Omega}_\Delta$ by:
    a. storing a complex baseband signal $z_{k,j}$, wherein $z_{k,j}$ representing a j-th sample of a k-th symbol of a received data, $0 \leq j \leq N-1$, N representing samples per symbol;
    b. calculating $c_{k,j}=z_{k+1,j}z_{k,j}^*$, wherein the $z_{k,j}^*$ is the conjugate complex number of $z_{k,j}$;
    c. obtaining V by summation of $c_{k,j}$ over L and N, wherein L is a predetermined number;
    d. obtaining the frequency offset estimation $\hat{\Omega}_\Delta$ by removing $\hat{\Omega}_d$ from arg(V) and normalized by T, wherein arg(V) is an angle of V, T is a symbol time, $\hat{\Omega}_d$ is determined by $N_1$, $N_2$, $N_3$, $N_4$ and h, $N_1$ representing number of occurrences of $b_k=b_{k+1}=1$, $N_2$ representing number of occurrences of $b_k=b_{k+1}=-1$, $N_3$ representing number of occurrences of $b_k=1$, $b_{k+1}=-1$, $N_4$ representing number of occurrences of $b_k=-1$, $b_{k+1}=1$, $b_k$ is a value of a kth symbol of the preamble data t(k), h is a modulation index of the GFSK communication system;

(26.2) generating a complex digital decimated signal $z_{k,\hat{j}}$ by:
    a. obtaining a first value A and a second value B by $A=C\cos(\hat{\Omega}_\Delta T)$, $B=C\sin(\hat{\Omega}_\Delta T)$, wherein C is a constant;
    b. obtaining a third value $u_j$ by summation of $|\text{Im}(c_{k,j})*A + \text{Re}(c_{k,j})*B|$ over L; and
    c. choosing the symbol timing $\hat{j}$ with the largest $u_j$ by $$\hat{j} = \arg\left\{\max_j u_j\right\};$$

(26.3) demodulating the complex digital decimated signal $z_{k,\hat{j}}$ to generate the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by:
    a. obtaining a first angle $\theta$ by $\Theta = C_2\hat{\Omega}_\Delta T - b_{k-1}\cdot\pi h\delta$, wherein h is a demodulation index in the GFSK communication system $$\delta = \frac{\int_{-T}^{0} p(t)dt}{\int_{-\infty}^{\infty} p(t)dt},$$

is a Gaussian function;
    b. obtaining a second angle $\Lambda$ by $$\Lambda = C_3\hat{\Omega}_\Delta T + \begin{cases} -\pi h + 2\delta\pi h & b_{k-2}=0, b_{k-1}=1 \\ \pi h - 2\delta\pi h & b_{k-2}=1, b_{k-1}=0; \text{ and} \\ -\pi h \cdot b_{k-1} & \text{otherwise} \end{cases}$$

c. obtaining $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by $$\hat{b}_k = sgn[\text{Im}(z_{k-1,\hat{j}}^* \cdot z_{k,\hat{j}} \cdot e^{j\Theta} + C_1 \cdot z_{k+1,\hat{j}} \cdot z_{k-1,\hat{j}}^* \cdot e^{j\Lambda})],$$

where $C_1$, $C_2$, $C_3$ are constants, $z_{k,\hat{j}}^*$ is the conjugate complex number of $z_{k,\hat{j}}$, and "sgn" represents taking sign of a quantity by "0" for a negative sign and "1" for a positive sign and zero;

(26.4) obtaining a starting bit $\hat{b}_k$ of the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by:
    a. responsive to the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ and the preamble data t(k), obtaining a series of coefficient coff(k) by summation of b(k+n)(xor)t(k) over M, wherein M is number of bits; and
    b. choosing the starting bit $\hat{b}_k$ of the binary sequence $b(k)=\{\hat{b}_0, \hat{b}_1, \hat{b}_2, \ldots, \hat{b}_{k-2}, \hat{b}_{k-1}, \hat{b}_k, \hat{b}_{k+1}, \ldots\}$ by min(coff(k)).

* * * * *